United States Patent
Zhou

(10) Patent No.: US 10,813,039 B2
(45) Date of Patent: Oct. 20, 2020

(54) METHOD AND DEVICE FOR TRANSMITTING SYSTEM INFORMATION, USER EQUIPMENT AND NETWORK DEVICE

(71) Applicant: BAICELLS TECHNOLOGIES CO. LTD., Beijing (CN)

(72) Inventor: Mingyu Zhou, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 115 days.

(21) Appl. No.: 16/303,582

(22) PCT Filed: May 11, 2017

(86) PCT No.: PCT/CN2017/083970
§ 371 (c)(1),
(2) Date: Nov. 20, 2018

(87) PCT Pub. No.: WO2017/202209
PCT Pub. Date: Nov. 30, 2017

(65) Prior Publication Data
US 2019/0274092 A1    Sep. 5, 2019

(30) Foreign Application Priority Data

May 23, 2016    (CN) .......................... 2016 1 0344936

(51) Int. Cl.
*H04W 48/12*    (2009.01)
*H04W 48/10*    (2009.01)
(Continued)

(52) U.S. Cl.
CPC ........... *H04W 48/12* (2013.01); *H04W 36/08* (2013.01); *H04W 36/16* (2013.01); *H04W 36/36* (2013.01);
(Continued)

(58) Field of Classification Search
CPC . H04W 48/12; H04W 72/1289; H04W 48/10; H04W 36/36; H04W 36/16; H04W 36/08
See application file for complete search history.

(56) References Cited

U.S. PATENT DOCUMENTS

2007/0049344 A1* 3/2007 Van Der Velde ..... H04W 48/12
455/560
2009/0253401 A1* 10/2009 Lee ....................... H04W 76/50
455/404.1

(Continued)

FOREIGN PATENT DOCUMENTS

| CN | 101742572 A | 6/2010 |
| CN | 102378129 A | 3/2012 |

(Continued)

OTHER PUBLICATIONS

1st Office Action for Chinese Application No. 201610344936.5, dated Apr. 26, 2019—9 pages (plus Translation—9 pages).

(Continued)

*Primary Examiner* — Hoang-Chuong Q Vu
(74) *Attorney, Agent, or Firm* — Culhane Meadows PLLC; Stephen J. Weed

(57) ABSTRACT

A method and a device for transmitting system information, a UE and a network device are provided. The method includes: acquiring scheduling information transmitted from a network device; determining a transmission subframe scheduled by the network device for the system information in accordance with the scheduling information, the system information including first system information and/or second system information, the first system information being system information of a first type, the second system information being system information of a second type; and receiving the system information transmitted from the network device within the transmission subframe.

16 Claims, 6 Drawing Sheets

(51) Int. Cl.
*H04W 36/08* (2009.01)
*H04W 36/16* (2009.01)
*H04W 36/36* (2009.01)
*H04W 72/12* (2009.01)

(52) U.S. Cl.
CPC ....... *H04W 48/10* (2013.01); *H04W 72/1289* (2013.01)

(56) References Cited

U.S. PATENT DOCUMENTS

| | | | |
|---|---|---|---|
| 2010/0227611 A1* | 9/2010 | Schmidt | H04W 76/15 455/434 |
| 2011/0205952 A1 | 8/2011 | Gou et al. | |
| 2011/0292893 A1 | 12/2011 | Lee et al. | |
| 2014/0206345 A1* | 7/2014 | Tanaka | H04B 17/391 455/425 |
| 2014/0307662 A1* | 10/2014 | Zheng | H04W 72/082 370/329 |
| 2015/0263829 A1* | 9/2015 | Nguyen | H04W 72/1289 370/280 |
| 2016/0088595 A1* | 3/2016 | You | H04W 4/70 370/329 |
| 2016/0198406 A1* | 7/2016 | Hoglund | H04W 76/28 370/311 |
| 2016/0198407 A1* | 7/2016 | Hoglund | H04W 52/0216 370/311 |
| 2016/0373215 A1* | 12/2016 | Nan | H04W 72/042 |
| 2017/0230951 A1* | 8/2017 | Xiong | H04W 72/042 |
| 2018/0262975 A1* | 9/2018 | Martinez Tarradell | H04W 74/008 |
| 2018/0270634 A1* | 9/2018 | Kim | H04W 72/0406 |
| 2018/0270738 A1* | 9/2018 | Martinez Tarradell | H04W 48/16 |
| 2019/0116533 A1* | 4/2019 | Lee | H04W 92/20 |

FOREIGN PATENT DOCUMENTS

| | | |
|---|---|---|
| CN | 103634882 A | 3/2014 |
| CN | 104518843 A | 4/2015 |
| CN | 105210321 A | 12/2015 |
| WO | 2012006179 A1 | 1/2012 |
| WO | 2016048422 A1 | 3/2016 |

OTHER PUBLICATIONS

International Search Report and Written Opinion for International Application No. PCT/CN2017/083970, dated Jun. 30, 2017—11 pages (plus Translation of Written Opinion—4 pages).

\* cited by examiner

METHOD AND DEVICE FOR TRANSMITTING SYSTEM INFORMATION, USER EQUIPMENT AND NETWORK DEVICE

CROSS-REFERENCE TO RELATED APPLICATION

The present application is the U.S. national phase of PCT Application No. PCT/CN2017/083970 filed on May 11, 2017, which claims a priority of the Chinese patent application No. 201610344936.5 filed in China on May 23, 2016, which are incorporated herein by reference in their entirety.

TECHNICAL FIELD

The present disclosure relates to the field of communication technology, in particular to a method and a device for transmitting system information, a User Equipment (UE) and a network device.

BACKGROUND

Mobile communication system is a system for providing communication services to UEs (also called terminals, e.g., mobile phones) by an operator through the deployment of radio access network devices (e.g., network devices) and core network devices (e.g., Home Location Register (HLR)). Currently, the mobile communication system has been developed from the first generation (1G) to the fourth generation (4G). The IG mobile communication system refers to an initial analogue cellular phone standard where merely voice communication services are provided, and mainly an analogue technique and a Frequency Division Multiple Access (FDMA) method are used. A digital technique is introduced into the 2G mobile communication system, so as to improve the network capacity, the voice quality and the security, represented by Global System for Mobile Communication (GSM) and Code Division Multiple Access (CDMA) Interim Standard (IS)-95. The 3G mobile communication system mainly refers to CDMA2000, Wireless CDMA (WCDMA), Time Division-Synchronization CDMA (TD-SCDMA), where the CDMA is used as an access technique. For the 4G mobile communication system, a relatively uniform standard is adopted, i.e., Long Term Evolution/Long Term Evolution-Advanced (LTE/LTE-A) formulated by $3^{rd}$-Generation Partnership Project (3GPP). For the LTE/LTE-A system, its downlink transmission is performed on the basis of an Orthogonal Frequency Division Multiple Access (OFDMA) technique, and its uplink transmission is performed on the basis of a Single Carrier-Frequency Division Multiple Access (SC-FDMA) technique. Due to a flexible bandwidth and a self-adaptive modulation encoding mode, it is able to achieve high-speed transmission at a downlink peak rate of 1 Gbps and an uplink peak rate of 500 Mbps.

MulteFire (MF) is an LTE technique which has newly defined an uplink transmission method on the basis of an LTE Release 13 (R13) Licensed Assistant Access (LAA) downlink transmission method and which may be operated at a non-licensed frequency band individually, i.e., stand-alone LTE-U. In an LTE system, System Information (SI) includes System Information Block1 (SIB1) and the other types of SI. SIB1 is transmitted periodically, and such parameters as SIB type and a corresponding period included in each piece of the subsequent SI is indicated in the SIB1, The SIB1 is orthogonal to each SI through corresponding subframe windows divided in a time domain. Within a same subframe, merely one SIB1 or one piece of SI may be detected by a UE. In an MF system, each eSIB may be transmitted through a specific subframe (e.g., a Discovery Reference Signal (DRS) subframe) using a Listen Before Talk (LBT) mechanism within a relatively short time period (e.g., 25 µs). However, when some SI needs to be transmitted at the non-licensed frequency band, due to the relatively long time period for the LBT mechanism, it is impossible to ensure that the allocated subframe windows are occupied all the time. The SI may not be transmitted successfully through to the LBT mechanism, so an actual transmission period of the SI may become longer. At this time, an access time delay of the UE may increase, and even cell reselection may occur.

SUMMARY

An object of the present disclosure is to provide a method and a device for transmitting system information, a UE and a network device, so as to solve the problem in the related art where the access time delay of the UE increase and even the cell reselection occurs due to a long transmission time period of some SIBs.

In one aspect, the present disclosure provides in some embodiments a method for transmitting system information for use in a UE, including: acquiring scheduling information transmitted from a network device; determining a transmission subframe scheduled by the network device for the system information in accordance with the scheduling information, the system information including first system information and/or second system information, the first system information being system information of a first type, the second system information being system information of a second type; and receiving the system information transmitted from the network device within the transmission subframe.

In a possible embodiment of the present disclosure, the determining the transmission subframe scheduled by the network device for the system information in accordance with the scheduling information includes: performing descrambling analysis on the scheduling information in accordance with a Radio Network Temporary Identity (RNTI), so as to determine the transmission subframe scheduled by the network device for the system information.

In a possible embodiment of the present disclosure, the determining the transmission subframe scheduled by the network device for the system information in accordance with the scheduling information includes: determining the transmission subframe scheduled by the network device for the system information in accordance with a specific field in the scheduling information, or determining the transmission subframe scheduled by the network device for the system information in accordance with an information format of the scheduling information.

In a possible embodiment of the present disclosure, it includes: determining a value of the specific field in the scheduling information; when the value of the specific field is a first value, determining that the transmission subframes scheduled by the network device for the first system information and the second system information are different from each other; and otherwise, determining that the transmission subframes scheduled by the network device for the first system information and the second system information are the same.

In a possible embodiment of the present disclosure, it includes: when the information format of the scheduling information is a first information format, determining that the transmission subframes scheduled by the network device for the first system information and the second system information are different from each other; and when the information format of the scheduling information is a second information format, determining that the transmission subframes scheduled by the network device for the first system information and the second system information are the same.

In a possible embodiment of the present disclosure, the determining the transmission subframe scheduled by the network device for the system information in accordance with the scheduling information includes: acquiring a plurality of pieces of scheduling information corresponding to a specific transmission subframe; and determining the transmission subframe scheduled by the network device for the system information in accordance with the plurality of pieces of scheduling information corresponding to the specific transmission subframe.

In a possible embodiment of the present disclosure, it includes: when at least one of values of bits in the plurality of pieces of scheduling information corresponding to the specific transmission subframe is a second value, determining the specific transmission subframe to be the transmission subframe scheduled by the network device for the first system information; and when at least one of the values of bits in the plurality of pieces of scheduling information corresponding to the specific transmission subframe is a third value, determining the specific transmission subframe to be the transmission subframe scheduled by the network device for the second system information.

In a possible embodiment of the present disclosure, it includes: when at least one of information formats of the plurality of pieces of scheduling information corresponding to the specific transmission subframe is a third information format, determining the specific transmission subframe to be the transmission subframe scheduled by the network device for the first system information; and when at least one of values of bits in the plurality of pieces of scheduling information corresponding to the specific transmission subframe is a fourth information format, determining the specific transmission subframe to be the transmission subframe scheduled by the network device for the second system information.

In a possible embodiment of the present disclosure, it includes: determining serial number information about the second system information in accordance with a Master Information Block (MIB) or the value of the specific field in the scheduling information; and determining a type of an SIB corresponding to the serial number information about the second system information.

In a possible embodiment of the present disclosure, it includes: determining a size of a transport block occupied by the first system information and/or a size of a transport block occupied by the second system information in accordance with the scheduling information.

In another aspect, the present disclosure provides in some embodiments a method for transmitting system information for use in a network device, including: transmitting scheduling information to a UE, the scheduling information being used to indicate a transmission subframe scheduled by the network device for the system information, the system information including first system information and/or second system information, the first system information being system information of a first type, the second system information being system information of a second type; and transmitting the system information to the UE within the transmission subframe.

In a possible embodiment of the present disclosure, prior to transmitting the scheduling information to the UE, the method further includes scrambling the scheduling information in accordance with an RNTI.

In a possible embodiment of the present disclosure, it includes: when different transmission subframes are scheduled for the first system information and the second system information, scrambling the scheduling information with a first RNTI; and when the same transmission subframe is scheduled for the first system information and the second system information, scrambling the scheduling information with a second RNTI.

In a possible embodiment of the present disclosure, a specific field or an information format of the scheduling information is used to indicate the transmission subframe scheduled by the network device for the system information.

In a possible embodiment of the present disclosure, when a value of the specific field is a first value, it indicates that the transmission subframe scheduled for the first system information and the transmission subframe scheduled for the second system information are different from each other, and when otherwise, it indicates that the transmission subframe scheduled for the first system information and the transmission subframe scheduled for the second system information are same.

In a possible embodiment of the present disclosure, when the information format of the scheduling information is a first information format, it indicates that the transmission subframe scheduled for the first system information and the transmission subframe scheduled for the second system information are different from each other, and when the information format of the scheduling information is a second information format, it indicates that the transmission subframe scheduled for the first system information and the transmission subframe scheduled for the second system information are the same.

In a possible embodiment of the present disclosure, a plurality of pieces of scheduling information corresponding to a specific transmission subframe is used to indicate that the specific transmission subframe is the transmission subframe scheduled for at least one of the first system information or the second system information.

In a possible embodiment of the present disclosure, the transmitting the system information to the UE within the transmission subframe includes: determining a size of a transport block for transmitting the first system information and a size of a transport block for transmitting the second system information in accordance with a value of bits for the first system information and a value of bits for the second system information respectively; and transmitting each of the first system information and the second system information to the UE through the corresponding transport blocks.

In yet another aspect, the present disclosure provides in some embodiments a device for transmitting system information, including: an acquisition module configured to acquire scheduling information transmitted from a network device; a processing module configured to determine a transmission subframe scheduled by the network device for the system information in accordance with the scheduling information, the system information including first system information and/or second system information, the first system information being system information of a first type, the second system information being system information of a second type; and a reception module configured to receive the system information transmitted from the network device within the transmission subframe.

In still yet another aspect, the present disclosure provides in some embodiments a device for transmitting system information for use in a network device, including: a first transmission module configured to transmit scheduling information to a UE, the scheduling information being used to indicate a transmission subframe scheduled by the network device for the system information, the system information including first system information and/or second system information, the first system information being system information of a first type, the second system information being system information of a second type; and a second transmission module configured to transmit the system information to the UE within the transmission subframe.

In still yet another aspect, the present disclosure provides in some embodiments a UE, including: a receiver configured to acquire scheduling information transmitted from a network device; and a processor connected to the receiver and configured to determine a transmission subframe scheduled by the network device for the system information, the system information including first system information and/or second system information, the first system information being system information of a first type, the second system information being system information of a second type. The receiver is further configured to transmit the system information to the UE within the transmission subframe.

In a possible embodiment of the present disclosure, the processing module is further configured to perform descrambling analysis on the scheduling information in accordance with an RNTI, so as to determine the transmission subframe scheduled by the network device for the system information.

In a possible embodiment of the present disclosure, the processing module is further configured to determine the transmission subframe scheduled by the network device for the system information in accordance with a specific field in the scheduling information, or determine the transmission subframe scheduled by the network device for the system information in accordance with an information format of the scheduling information.

In still yet another aspect, the present disclosure provides in some embodiments a network device, including: a processor configured to generate scheduling information, the scheduling information being used to indicate a transmission subframe scheduled by the network device for the system information, the system information including first system information and/or second system information, the first system information being system information of a first type, the second system information being system information of a second type; and a transmitter configured to transmit the scheduling information to a UE, and transmit the system information to the UE within the transmission subframe.

According to the method and device for transmitting the system information, the UE and the network device in the embodiments of the present disclosure, the transmission subframe scheduled by the network device for the first system information and/or the second system information is determined in accordance with the scheduling information, so as to determine whether the first system information and the second system information are capable of being transmitted within the same transmission subframe. As a result, it is able to increase the quantity of the pieces of system information to be transmitted within one transmission subframe, thereby to reduce the adverse impact on the transmission of the system information due to a longer transmission period caused when the system information has not been transmitted successfully through the LBT mechanism.

DETAILED DESCRIPTION OF THE EMBODIMENTS

In order to make the objects, the technical solutions and the advantages of the present disclosure more apparent, the present disclosure will be described hereinafter in details in conjunction with the drawings and embodiments.

In a MF network in related art, an LBT mechanism may be adopted. It may take a long time period when some SI is transmitted within subframes other than a DRS subframe at a non-licensed frequency band, so it is impossible to ensure that allocated subframe windows are occupied all the time. The SI may not be transmitted successfully through the LBT mechanism, so an actual transmission period of the SI may become longer. At this time, an access time delay of the UE may increase, and even cell reselection may occur. In order to solve this problem, a same transmission subframe may be scheduled for an eSIB and the SI, but there is an urgent need to provide a scheme for indicating whether the eSIB and the SI are transmitted within the same transmission subframe. An object of the present disclosure is to provide a method and a device for transmitting system information, a UE and a network device, so as to determine the transmission subframe scheduled by the network device for first system information and second system information through parsing scheduling information transmitted from the network device, thereby to reduce or even prevent the occurrence of the long access time delay due to the long SIB transmission period.

Figure 1:
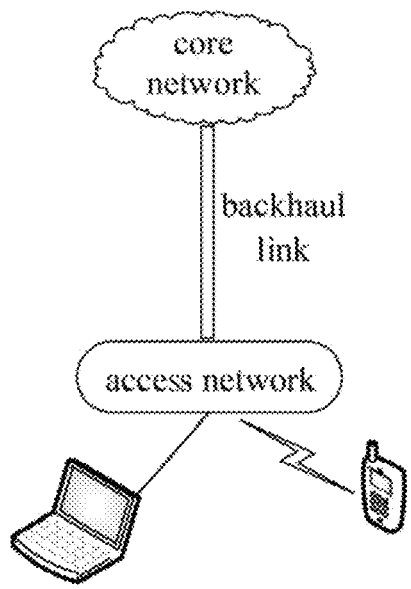
FIG. 1 is a schematic view showing basic architecture of a mobile communication network.

FIG. 1 briefly shows basic architecture of a mobile communication network, where a UE communicates with a core network through an access network. The schemes in the embodiments of the present disclosure may be applied to this architecture.

Figure 2:
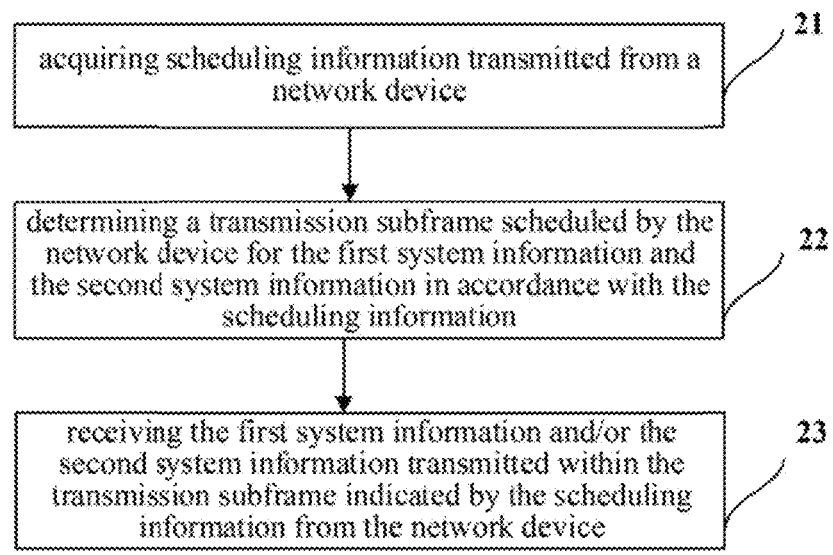
FIG. 2 is a flow chart of a method for transmitting system information according to one embodiment of the present disclosure.

The present disclosure provides in some embodiments a method for transmitting system information which, as shown in FIG. 2, includes the following steps.

Step 21: acquiring scheduling information transmitted from a network device.

The scheduling information may refer to scheduling information about a downlink transmission channel, and the downlink transmission channel may be a downlink transmission channel for the transmission of a downlink data signal, e.g., Physical Downlink Shared Channel (PDSCH), or a downlink transmission channel for the transmission of a downlink control signal, e.g., Physical Downlink Control Channel (PDCCH) or enhanced PDCCH (ePDCCH). The scheduling information may be transmitted within the downlink control channel (the PDCCH or ePDCCH), and such information as a position of a resource occupied by the downlink transmission channel scheduled by the network device may be carried in the scheduling information. The scheduling information may be transmitted in Downlink Control Information (DCI) carrying a downlink (DL) grant.

Step 22: determining a transmission subframe scheduled by the network device for the system information in accordance with the scheduling information. The system information includes first system information and/or second system information. To be specific, the transmission subframes scheduled by the network device for the first system information and the second system information may be determined in accordance with the scheduling information.

The first system information is system information of a first type, and the second system information is system information of a second type, i.e., the type of the second system information is different from the type of the first system information. To be specific, the first system information may be system information of a type known to the UE, i.e., an eSIB, and the second system information may be system information of a type unknown to the UE, i.e., the SIBs other than the eSIB, e.g., SIBx (x is a positive integer). It should be appreciated that, the second system information may be a set of the SIBs other than the eSIB, and the SIBs may be carried through one or more pieces of SI. One SI at least includes one SIB, and such information as a mapping relationship between the SI and the SIBs as well as a transmission position of the SI may be indicated in the eSIB. The UE may parse the received scheduling information for the transmission of the SI, so as to determine whether a current transmission subframe is capable of receiving the eSIB (i.e., acquiring a position of the transmission subframe) and the SI. The eSIB and the SI may each be transmitted within a respective transmission subframe, or they may be transmitted within the same transmission subframe.

Further, the eSIB may be transmitted within a DRS subframe (any subframe within a DTxW) and some specific subframes (e.g., subframe #0) in the standard of the related art, so Step 22 may also be understood as determining the transmission subframe for the eSIB in accordance with the scheduling information, and then determining whether the SI is transmitted simultaneously within the transmission subframe for the eSIB.

Each piece of SI may probably include a plurality of SIBs, so a type of each SIB may be indicated in the scheduling information, or the type of each SIB included in each piece of SI and a position of a corresponding subframe may be indicated according to the eSIB, and a number of each piece of SI and the type of each SIB included in the SI may be determined in accordance with a number of the current transmission subframe. When the eSIB and the SI are transmitted simultaneously within the same transmission subframe, one Transport Block (TB) may be adopted, and bits in the TB may be the eSIB and the SIBs included in the SI sequentially. Alternatively, a plurality of TBs corresponding to the eSIB and the SI may be adopted.

Step 23: receiving the first system information and/or the second system information transmitted within the transmission subframe indicated by the scheduling information from the network device.

According to the embodiments of the present disclosure, the transmission subframes for the eSIB and the SI may be acquired through parsing the scheduling information. When the eSIB and the SI are transmitted within the same transmission subframe, the UE may receive the eSIB and the SI within the transmission subframe. As a result, it is able to increase the quantity of the system information to be transmitted within one transmission subframe, thereby to prevent the occurrence of a long access time relay or cell reselection for the UE due to a long transmission period of the system information.

Figure 3:
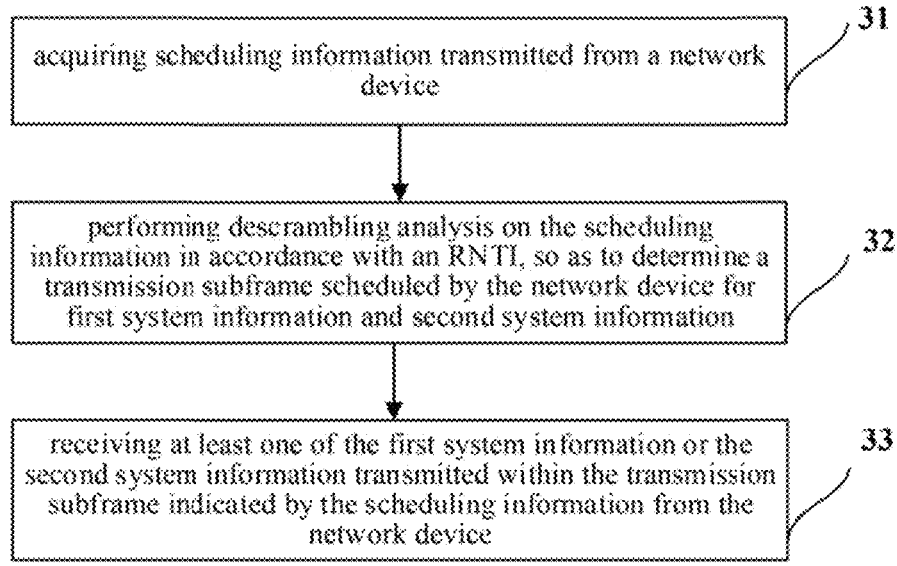
FIG. 3 is another flow chart of a method for transmitting system information according to one embodiment of the present disclosure.

The present disclosure further provides in a second embodiment a method for transmitting system information which, as shown in FIG. 3, includes the following steps.

Step 31: acquiring scheduling information transmitted from a network device.

Step 32: performing descrambling analysis on the scheduling information in accordance with an RNTI, so as to determine a transmission subframe scheduled by the network device for first system information and second system information.

When blind detection is performed by a UE on the scheduling information, the descrambling analysis may be performed on the scheduling information in accordance with the RNTI, so as to determine the transmission subframes for an eSIB and SI. It should be appreciated that, when the UE determines that a current transmission subframe is a DRS subframe in accordance with a detected DRS, the eSIB may be transmitted within the DRS subframe by default.

To be specific, the blind detection may be performed on the scheduling information, e.g., DCI, in accordance with different RNTIs so as to determine the transmission subframes for the eSIB and the SI. When the scrambled RBTIs are different from each other, indication contents in a DCI format of a same size may be different from each other, and selected columns in a TBS table may be different from each other too. When the scheduling information has been descrambled successfully in accordance with a first RNTI, different transmission subframes may be scheduled by the network device for the first system information and the second system information. When the scheduling information has been descrambled successfully in accordance with a second RNTI, the same transmission subframe may be scheduled by the network device for the first system information and the second system information.

Taking the DRS subframe as an example, during the blind detection on the DCI by the UE, the UE may descramble a Cyclic Redundancy Check (CRC) of the Da in accordance with an RNTI having a value of a (a first value) and an RNTI having a value of b (a second value), where a and b are 16-bit binary numbers different from each other. When the DCI has been descrambled successfully in accordance with the RNTI having a value of a, it may be deemed that merely the eSIB is transmitted within the DRS subframe scheduled in the DCI, and when the DCI has been descrambled successfully in accordance with the RNTI having a value of b, it may be deemed that both the eSIB and the SI are transmitted within the DRS subframe scheduled in the DCI. When both the eSIB and the SI are transmitted simultaneously within the same transmission subframe, a type of each SIB included in the SI may be indicated in the scheduling information, or the type of the SIB included in each SI and a position of a corresponding subframe may be indicated in the eSIB, and the type of the SIB included in the SI may be determined in accordance with a serial number of a current transmission subframe. In addition, it may be indicated in accordance with a serial number of each piece of SI and/or a type of each SIB, which has been prescribed or configured in the eSIB, to be transmitted within the DRS subframe. When the eSIB and the SI are transmitted through the same TB, bits in the TB corresponding to the transmission subframe may be the eSIB and the SIBs included in the SI sequentially. The UE may acquire the eSIB and then the SIBs in the SI in accordance with a sequence of the bits. When the eSIB and the DRS are transmitted within the same transmission subframe simultaneously, whether the eSIB and the DRS are carried by the same TB or a plurality of TBs may be indicated by a physical layer in a dynamic manner, indicated by a high layer in a semi-static manner, or indicated directly in accordance with the standard.

Step 33: receiving at least one of the first system information or the second system information transmitted within the transmission subframe indicated by the scheduling information from the network device.

According to the embodiments of the present disclosure, the descrambling analysis may be performed on the scheduling information DCI in accordance with different RNTIs, so as to determine whether the eSIB and the SI are transmitted simultaneously within the same transmission subframe. When the eSIB and the SI are transmitted within the same transmission subframe, the UE may receive the eSIB and the SI within the transmission subframe. As a result, it is able to increase the quantity of the system information to be transmitted within one transmission subframe, thereby to prevent the occurrence of a long access time relay or cell reselection for the UE due to a long transmission period of the system information.

Figure 4:
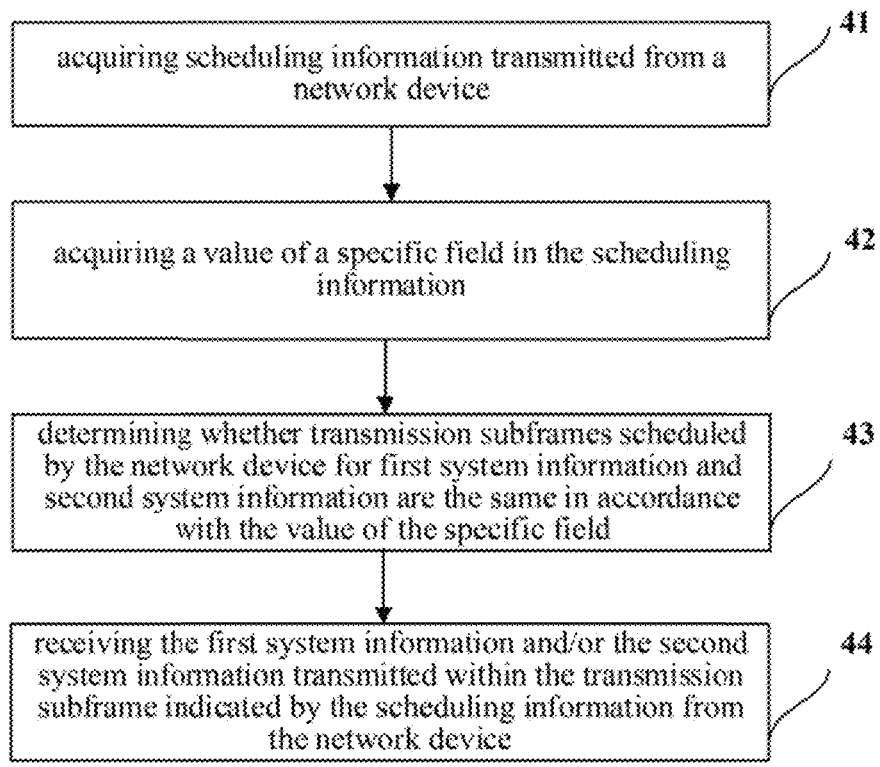
FIG. 4 is yet another flow chart of a method for transmitting system information according to one embodiment of the present disclosure.

The present disclosure further provides in some embodiments a method for transmitting system information which, as shown in FIG. 4, includes the following steps.

Step 41: acquiring scheduling information transmitted from a network device.

Step 42: acquiring a value of a specific field in the scheduling information.

Step 43: determining whether transmission subframes scheduled by the network device for first system information and second system information are the same in accordance with the value of the specific field.

The value of the specific field in DCI where the scheduling information is located may be acquired through descrambling analysis on the DCI in accordance with an RNTI. To be specific, the DCI may be descrambled in accordance with a predetermined RNTI (e.g., an SI-RNTI), and after the DCI has been descrambled successfully, it is able to acquire the value of the specific field in the DCI. Different values of the specific field correspond to different indication contents. When the value of the specific field is a first value, it determines that the transmission subframes scheduled by the network device for the first system information and the second system information may be different from each other, and otherwise, the transmission subframes scheduled by the network device for the first system information and the second system information may be the same.

The specific field may include one or more bits at a specific position. When a bit at a specific position is selected to represent indication information and a value of the bit is 0, an eSIB and SI may be transmitted within different transmission subframes (for a DRS subframe, when the value of the bit is 0, it determines that merely the eSIB may be transmitted within the DRS subframe), and when the value of the bit is 1, it determines that the eSIB and the SI may be transmitted within the same transmission subframe.

Further, when the specific field includes a plurality of bits at a specific position, information about a serial number of each piece of SI or a type of each SIB may be determined in accordance with the specific field. For example, when the values of the plurality of bits are all 0, it determines that the eSIB and the SI may be transmitted within different transmission subframes (for the DRS subframe, when the values of the bits are all 0, it determines that merely the eSIB may be transmitted within the DRS subframe). When at least one of the bits has a value of 1, it determines that the eSIB and the SI may be transmitted within the same transmission subframe. Different serial numbers of the pieces of SI or the SIBs may be indicated by different combinations of the values of the bits. Taking the DRS subframe as an example, when 20 types of SIBs are supported by an MF network, 5 types of SIBs may be indicated in the eSIB and transmitted within 3 pieces of SI. The eSIB may be transmitted within the DRS subframe by default. At this time, 3 specific bits in the DCI (e.g., 3 bits in a Hybrid Automatic Repeat Request (HARQ) process) may be used to indicate the serial numbers of the pieces of SI to be transmitted within the DRS subframe. The more the specific bits, the more the numbers of the pieces of SI to be indicated. It should be appreciated that, the numbers of the pieces of SI or the SIBs may be the numbers of all the pieces of SI or all the SIBs in a current system, or the serial numbers of the pieces of SI or SIBs capable of being transmitted within a same transmission subframe (e.g., a DRS subframe) as the eSIB. The specific pieces of SI and the specific SIBs capable of being transmitted within the same transmission subframe as the eSIB may be configured by an evolved Node B (eNB) or prescribed in the standard.

Step 44: receiving the first system information and/or the second system information transmitted within the transmission subframe indicated by the scheduling information from the network device.

According to the embodiments of the present disclosure, the descrambling analysis may be performed on the DCI including the scheduling information in accordance with the predetermined RNTI, so as to acquire the descrambled DCI. Next, whether the eSIB and the SI are transmitted simultaneously within the same transmission subframe may be determined in accordance with the value of the specific field in the DCI. When the eSIB and the SI are transmitted simultaneously within the same transmission subframe, the UE may receive the eSIB and the SI within the transmission subframe. As a result, it is able to increase the quantity of the system information to be transmitted within one transmission subframe, thereby to prevent the occurrence of a long access time relay or cell reselection for the UE due to a long transmission period of the system information. In addition, it is able to determine the serial number of each piece of SI and/or the serial number of each SIB to be transmitted within the same transmission subframe as the eSIB in accordance with the value of the specific field in the DCI.

Figure 5:
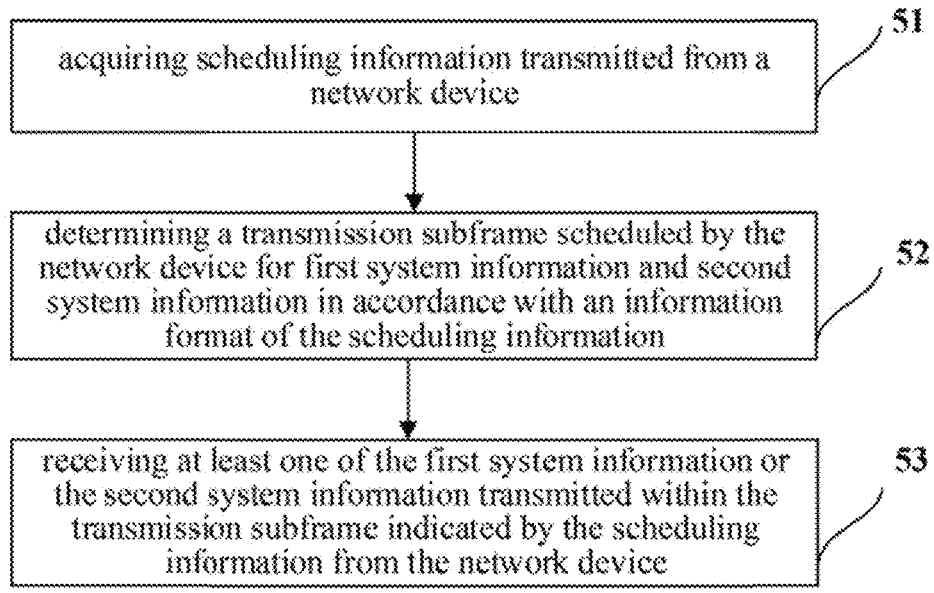
FIG. 5 is still yet another flow chart of a method for transmitting system information according to one embodiment of the present disclosure.

The present disclosure further provides in some embodiments a method for transmitting system information which, as shown in FIG. 5, includes the following steps.

Step 51: acquiring scheduling information transmitted from a network device.

Step 52: determining a transmission subframe scheduled by the network device for first system information and second system information in accordance with an information format of the scheduling information.

The information format of DCI including the scheduling information may be acquired through descrambling analysis on the DCI in accordance with an RNTI. To be specific, blind detection may be performed on the DCI in accordance with a predetermined RNTI (e.g., an SI-RNTI) and a predetermined information format. After the reception has been performed successfully, the information format of the DCI (i.e., DCI format) may be determined. When the information format of the scheduling information is a first information format, it determines that the transmission subframes scheduled by the network device for the first system information and the second system information may be different from each other, and when the information format of the scheduling information is a second information format, it determines that the transmission subframes scheduled by the network device for the first system information and the second system information may be the same. Taking a DRS subframe as an example, an eSIB may be transmitted within the DRS subframe by default. DCI format 1C may be used to indicate that merely the eSIB is transmitted within the DRS subframe, and DCI format 1A may be used to indicate that both the eSIB and the SI are transmitted simultaneously within the DRS subframe.

Step 53: receiving at least one of the first system information or the second system information transmitted within the transmission subframe indicated by the scheduling information from the network device.

According to the embodiments of the present disclosure, the blind detection may be performed on the DCI including the scheduling information in accordance with the predetermined RNTI and the predetermined information format, the DCI format may be determined when the reception has been performed successfully, and then whether the eSIB and the SI are transmitted simultaneously within the same transmission subframe may be determined in accordance with the DCI format. When the eSIB and the SI are transmitted within the same transmission subframe, the UE may receive the eSIB and the SI within the transmission subframe. As a result, it is able to increase the quantity of the system information to be transmitted within one transmission subframe, thereby to prevent the occurrence of a long access time relay or cell reselection for the UE due to a long transmission period of the system information.

Figure 6:
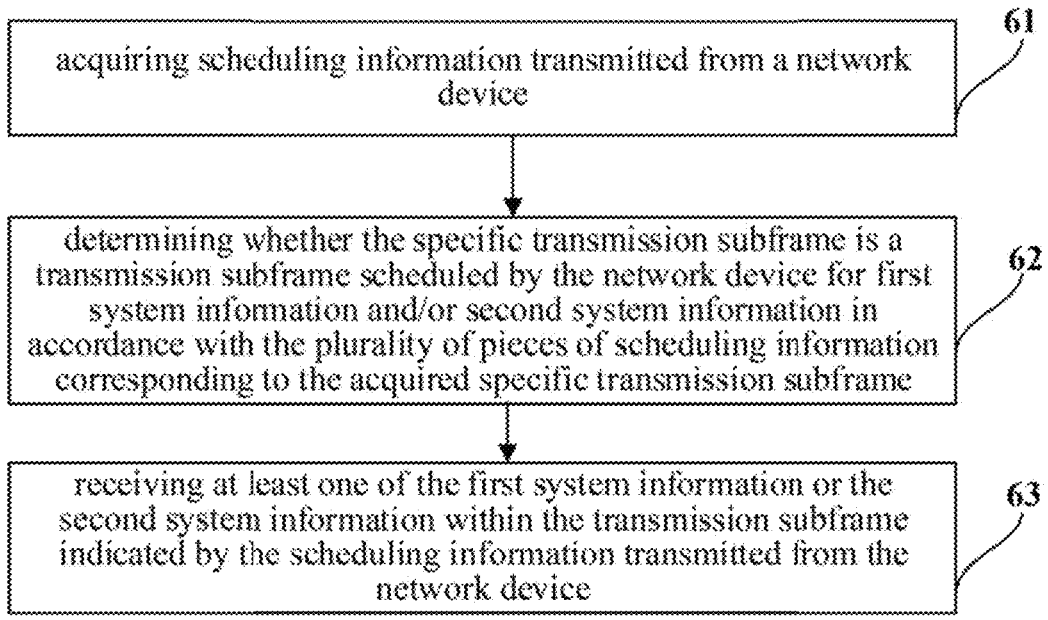
FIG. 6 is still yet another flow chart of a method for transmitting system information according to one embodiment of the present disclosure.

The present disclosure further provides in some embodiments a method for transmitting system information which, as shown in FIG. 6, includes the following steps.

Step 61: acquiring scheduling information transmitted from a network device. The network device may transmit a plurality of pieces of scheduling information within a specific transmission subframe, and different contents may probably be indicated in the plurality of pieces of scheduling information.

Step 62: determining whether the specific transmission subframe is a transmission subframe scheduled by the network device for first system information and/or second system information in accordance with the plurality of pieces of scheduling information corresponding to the specific transmission subframe.

In other words, the different pieces of scheduling information received by a UE may indicate different contents. Whether an eSIB and SI are transmitted within the corresponding specific transmission subframe may be determined in accordance with the contents indicated in the scheduling information. DCI including the plurality of pieces of scheduling information may be descrambled in accordance with a same RNTI or different RNTIs.

To be specific, whether the specific transmission subframe is the transmission subframe scheduled by the network device for the first system information and/or the second system information may be determined in accordance with values of specific bits in the plurality of pieces of scheduling information or information formats of the plurality of pieces of scheduling information, and two modes will be described hereinafter.

Mode 1: whether the specific transmission subframe is the transmission subframe scheduled by the network device for the first system information and/or the second system information may be determined in accordance with the values of the specific bits in the plurality of pieces of scheduling information corresponding to the specific transmission subframe.

When at least one of the values of the specific bits in the plurality of pieces of scheduling information corresponding to the specific transmission subframe is a second value, the specific transmission subframe may be determined as the transmission subframe scheduled by the network device for the first system information. When at least one of the values of the specific bits in the plurality of pieces of scheduling information corresponding to the specific transmission subframe is a third value, the specific transmission subframe may be determined as the transmission subframe scheduled by the network device for the second system information. In other words, different values of the specific bit may correspond to different indication contents. When the value of the specific bit is 0, it means the eSIB is transmitted within the specific transmission subframe, and when the value of the specific bit is 1, it means the SI is transmitted within the specific transmission subframe. In this way, it is able to determine whether the eSIB and the SI are transmitted within the specific transmission subframe simultaneously through parsing a plurality of pieces of DCL Mode 2: whether the specific transmission subframe is the transmission subframe scheduled by the network device for the first system information and/or the second system information may be determined in accordance with the information formats of the plurality of pieces of scheduling information corresponding to the acquired specific transmission subframe.

When at least one of the information formats of the plurality of pieces of scheduling information corresponding to the specific transmission subframe is a third information format, the specific transmission subframe may be determined as the transmission subframe scheduled by the network device for the first system information, and when at least one of the information formats of the plurality of pieces of scheduling information corresponding to the specific transmission subframe is a fourth information format, the specific transmission subframe may be determined as the transmission subframe scheduled by the network device for the second system information.

In other words, different DCI formats may correspond to different indication contents. DCI format 1C may be used to indicate that the eSIB is transmitted within the specific transmission subframe, and DCI format 1A may be used to indicate that the SI is transmitted within the specific transmission subframe. In this way, it is able to determine whether the eSIB and the SI are transmitted simultaneously within the corresponding specific transmission subframe through parsing a plurality of pieces of DCI.

Step 63: receiving at least one of the first system information or the second system information within the transmission subframe indicated by the scheduling information transmitted from the network device.

According to the embodiments of the present disclosure, the descrambling analysis may be performed on the plurality of pieces of scheduling information in the specific transmission subframe in accordance with the predetermined RNTI, so as to acquire the descrambled DCI. Whether the eSIB and the SI are transmitted simultaneously within the specific transmission subframe may be determined in accordance with the value of the specific bit or the information format of each of the different pieces of DCI. When the eSIB and the SI are transmitted within the same transmission subframe, the UE may receive the eSIB and the SI within the transmission subframe. As a result, it is able to increase the quantity of the system information to be transmitted within one transmission subframe, thereby to prevent the occurrence of a long access time relay or cell reselection for the UE due to a long transmission period of the system information.

Figure 7:
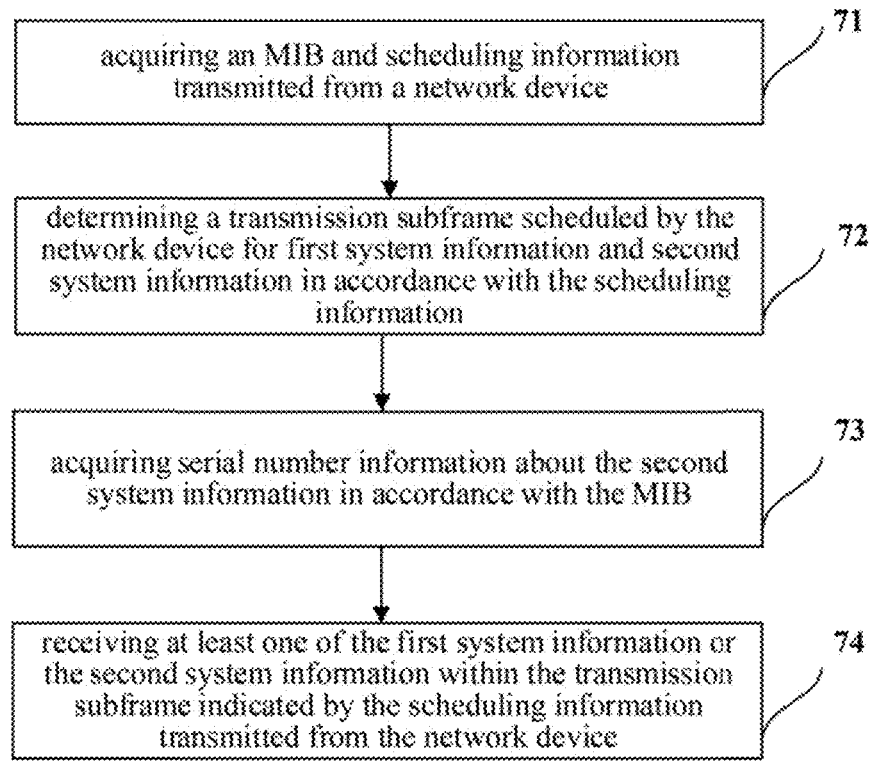
FIG. 7 is still yet another flow chart of a method for transmitting system information according to one embodiment of the present disclosure.

The present disclosure further provides in some embodiments a method for transmitting system information which, as shown in FIG. 7, includes the following steps.

Step 71: acquiring an MIB and scheduling information transmitted from a network device. The MIB may include important parameters capable of enabling to UE to acquire the other system information.

Step 72: determining a transmission subframe scheduled by the network device for first system information and second system information in accordance with the scheduling information. Whether an eSIB and SI are transmitted within the same transmission subframe may be determined in accordance with the acquired scheduling information.

Step 73: acquiring serial number information about the second system information in accordance with the MIB. The UE may acquire a frame number and a subframe number synchronously in accordance with the MIB, and determine a position of a frame and a subframe corresponding to each piece of SI in accordance with an SI parameter in the eSIB. The system information to be transmitted within a DRS subframe may include the MIB, the eSIB, and SIBs included in each piece of SI. Within the other transmission subframe, a serial number of each piece of SI and a serial number of each SIB may be determined in accordance with the subframe number.

Step 74: receiving at least one of the first system information or the second system information within the transmission subframe indicated by the scheduling information transmitted from the network device.

The frame number and the subframe number may be determined in accordance with the MIB, and then the number of SI corresponding to a current transmission subframe may be determined in accordance with the SI configuration parameter in the eSIB, so as to determine a type of each SIB in the SI within the current transmission subframe.

Seventh Embodiment

Figure 8:
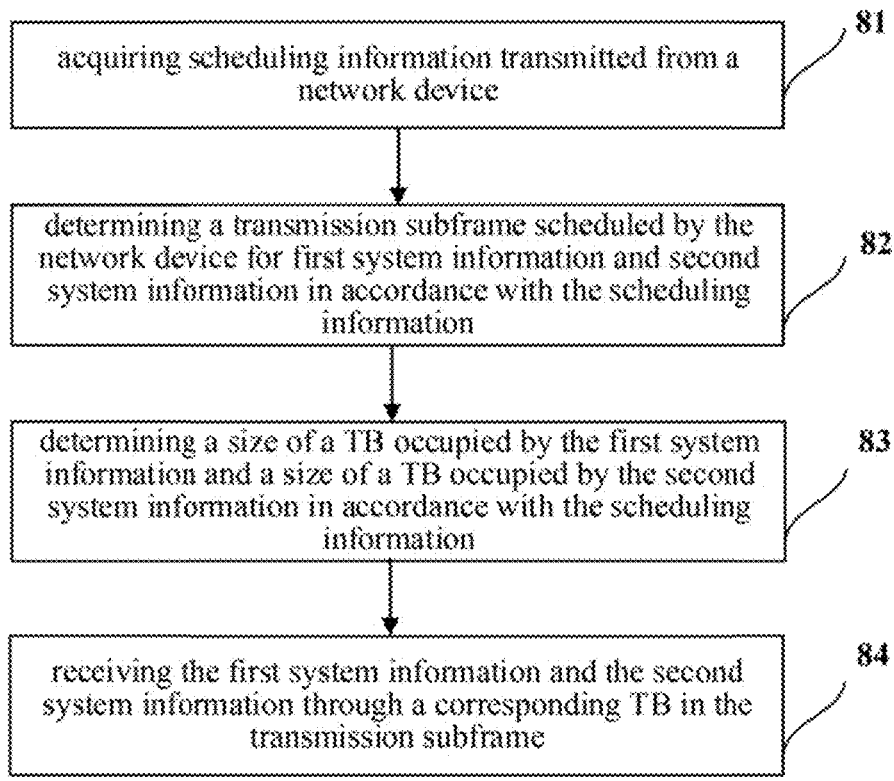
FIG. 8 is still yet another flow chart of a method for transmitting system information according to one embodiment of the present disclosure.

The present disclosure further provides in some embodiments a method for transmitting system information which, as shown in FIG. 8, includes the following steps.

Step 81: acquiring scheduling information transmitted from a network device.

Step 82: determining a transmission subframe scheduled by the network device for first system information and second system information in accordance with the scheduling information.

Step 83: determining a size of a TB occupied by the first system information and a size of a TB occupied by the second system information in accordance with the scheduling information.

Whether an eSIB and SI are transmitted within the same transmission subframe may be determined through parsing the scheduling information. When the eSIB and the SI are transmitted within different transmission subframes or through different TBs, the TBs of a relatively small size may be required, and a column corresponding to a relatively small amount of bits in a TBS table may be selected. When the eSIB and the SI are transmitted within the same transmission subframe and through the same TB, the TB of a relatively large size may be required, and a column corresponding to a relatively large amount of bits in the TBS table may be selected. For example, when the SI is indicated by DCI format 1A, TBSs in a second column and a third column in the TBS table may be indicated through 1 bit (column) in 2 bits of a Transmission Power Control (TPC) command in conjunction with an MCS (row). When the eSIB and the SI are transmitted simultaneously or the SI to be transmitted is of a relatively large bit data volume (e.g., an SIB for a large number of Participating Service Provider Identities (PSP-IDs)), a large TBS may be required, so a larger column may be selected. For example, the second and third columns may each be offset by a certain value, so that the eSIB and the SI correspond to a $(2+N)^{th}$ column and a $(3+N)^{th}$ column respectively (where N is a positive integer), or the eSIB and the SI correspond to a $(2+M)^{th}$ column and a $(3+L)^{th}$ column respectively (where M and L are different positive integers). In addition, a TBS for currently transmitting the SI or transmitting both the eSIB and the SI simultaneously in accordance with the number of SIBs included in the SI and configured in an eSIB (e.g., an eSIB transmitted separately and received previous) and/or indication information in the DCI (e.g., a reserved bit in the TPC command).

Step 84: receiving the first system information and the second system information through a corresponding TB in the transmission subframe. The eSIB and/or the SI may be received through the corresponding TB in the transmission subframe acquired through parsing the scheduling information.

The methods for transmitting the system information at a UE side have been described hereinabove. A corresponding device for transmitting the system information will be described hereinafter in accordance with the embodiments in conjunction with the drawings.

Figure 9:
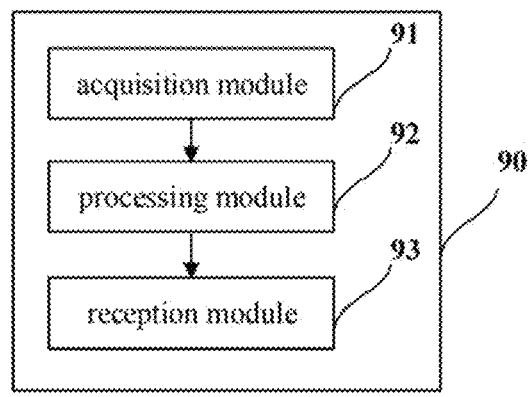
FIG. 9 is a block diagram of a device for transmitting the system information according to one embodiment of the present disclosure.

The present disclosure further provides in some embodiments an uplink transmission device 90 for a UE which, as shown in FIG. 9, at least includes: an acquisition module 91 configured to acquire scheduling information transmitted from a network device; a processing module 92 configured to determine a transmission subframe scheduled by the network device for the system information in accordance with the scheduling information, the system information including first system information and/or second system information, the first system information being system information of a first type, the second system information being system information of a second type; and a reception module 93 configured to receive the first system information and/or the second system information transmitted from the network device within the transmission subframe.

The processing module 92 includes a first processing unit configured to perform descrambling analysis on the scheduling information in accordance with an RNTI, so as to determine the transmission subframe scheduled by the network device for the first system information and the second system information.

The first processing unit includes: a descrambling subunit configured to descramble the scheduling information in accordance with different RNTIs; a first processing subunit configured to, when the scheduling information has been descrambled successfully in accordance with a first RNTI, determine that different transmission subframes are scheduled by the network device for the first system information and the second system information; and a second processing subunit configured to, when the scheduling information has been descrambled successfully in accordance with a second RNTI, determine that the same transmission subframe is scheduled by the network device for the first system information and the second system information.

The processing module 92 further includes: an acquisition unit configured to acquire a value of a specific field in the scheduling information; and a second processing unit configured to determine whether the transmission subframes scheduled by the network device for the first system information and the second system information are the same in accordance with the value of the specific field. To be specific, the second processing unit is configured to, when the value of the specific field is a first value, determine that different transmission subframes are scheduled by the network device for the first system information and the second system information, and otherwise, determine that the same transmission subframe is scheduled by the network device for the first system information and the second system information.

In a possible embodiment of the present disclosure, the processing module 92 further includes a third processing unit configured to determine serial number information about the second system information in accordance with the value of the specific field.

In a possible embodiment of the present disclosure, the processing module 92 further includes a fourth processing unit configured to determine the transmission subframe scheduled by the network device for the first system information and the second system information in accordance with an information format of the scheduling information. To be specific, the fourth processing unit is configured to, when the information format of the scheduling information is a first information format, determine that different transmission subframes are scheduled by the network device for the first system information and the second system information, and when the information format of the scheduling information is a second information format, determine that the same transmission subframe is scheduled by the network device for the first system information and the second system information.

In a possible embodiment of the present disclosure, the processing module 92 further includes a fifth processing unit configured to determine whether an acquired specific transmission subframe is the transmission subframe scheduled by the network device for the first system information and/or the second system information, according to a plurality of pieces of scheduling information corresponding to the specific transmission subframe.

In a possible embodiment of the present disclosure, the fifth processing unit includes a third processing subunit configured to: determine whether the specific transmission subframe is the transmission subframe scheduled by the network device for the first system information and/or the second system information in accordance with values of specific bits in the plurality of pieces of scheduling information corresponding to the acquired specific transmission subframe; when at least one of the values of the specific bits in the plurality of pieces of scheduling information corresponding to the specific transmission subframe is a second value, determine that the specific transmission subframe is the transmission subframe scheduled by the network device for the first system information; and when at least one of the values of the specific bits in the plurality of pieces of scheduling information corresponding to the specific transmission subframe is a third value, determine that the specific transmission subframe is the transmission subframe scheduled by the network device for the second system information.

In a possible embodiment of the present disclosure, the fifth processing unit includes a fourth processing subunit configured to: determine whether the specific transmission subframe is the transmission subframe scheduled by the network device for the first system information and/or the second system information in accordance with information formats of the plurality of pieces of scheduling information corresponding to the acquired specific transmission subframe; when at least one of the information formats of the plurality of pieces of scheduling information corresponding to the specific transmission subframe is a third information format, determine that the specific transmission subframe is the transmission subframe scheduled by the network device for the first system information; and when at least one of the information formats of the plurality of pieces of scheduling information corresponding to the specific transmission subframe is a fourth information format, determine that the specific transmission subframe is the transmission subframe scheduled by the network device for the second system information.

In a possible embodiment of the present disclosure, the device for transmitting the system information further includes: a first reception module configured to receive an MIB from the network device; and a calculation module configured to acquire serial number information about the second system information in accordance with the MIB.

In a possible embodiment of the present disclosure, the reception module 93 further includes: a sixth processing unit configured to determine a size of a TB occupied by each of the first system information and the second system information in accordance with the scheduling information; and a reception unit configured to receive each of the first system information and the second system information through the TB.

According to the embodiments of the present disclosure, the transmission subframe scheduled by the network device for the first system information and the second system information may be determined through parsing the scheduling information, so as to determine whether the first system information and the second system information are transmitted within the same transmission subframe. As a result, it is able to increase the quantity of the pieces of system information to be transmitted within one transmission subframe, thereby to reduce the adverse impact on the transmission of the system information due to a longer transmission period caused by the failure of the LBT mechanism.

The implementation of the device may refer to that of the method mentioned hereinabove, with a same technical effect.

Figure 10:
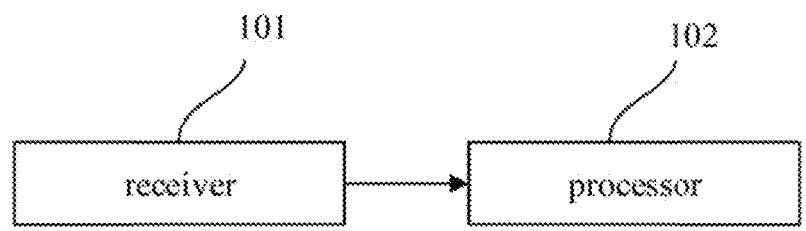
FIG. 10 is a block diagram of a UE according to one embodiment of the present disclosure.

The present disclosure further provides in some embodiments a UE which, as shown in FIG. 10, includes a receiver 101, a processor 102, and a memory configured to store therein instructions or data capable of being executed by the processor 102. The receiver 101 is configured to acquire scheduling information form a network device. The processor 102 is connected to the receiver 101 and configured to determine a transmission subframe scheduled by the network device for first system information and second system information in accordance with the scheduling information. The first system information is system information of a first type, and the second system information is system information of a second type. The receiver 101 is further configured to receive the first system information and/or the second system information transmitted from the network device within the transmission subframe.

The processor may be further configured to achieve the functions of all the modules of the above-mentioned device, with a same technical effect.

The method and device for transmitting the system information at the UE side as well as the UE have been described hereinabove. A method for transmitting system information at a network device side will be described hereinafter.

Figure 11:
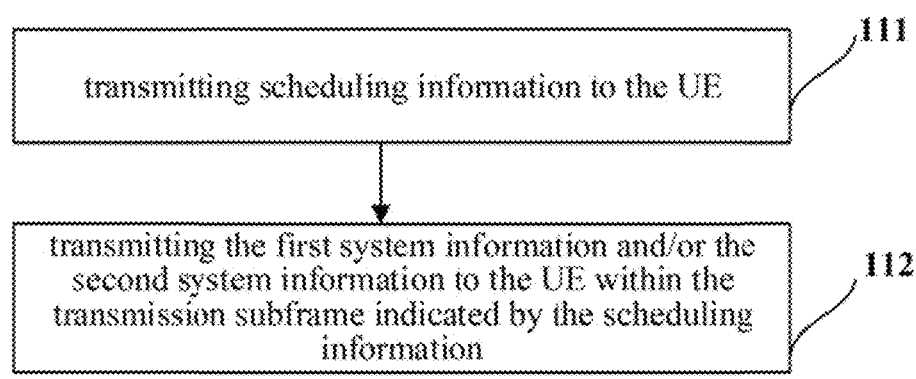
FIG. 11 is a flow chart of a method for transmitting system information according to one embodiment of the present disclosure.

The present disclosure further provides in some embodiments a method for transmitting system information for use in a network device which, as shown in FIG. 11, includes the following steps.

Step 111: transmitting scheduling information to a UE.

Here, the network device may be a network node such as a base station or an access point. When it is necessary to transmit the system information to the UE, the network device may schedule a downlink transmission channel for the to-be-transmitted system information. The downlink transmission channel may be a downlink transmission channel for the transmission of a downlink data signal, e.g., PDSCH, or a downlink transmission channel for the transmission of a downlink control signal, e.g., PDCCH or ePDCCH. The scheduling information may be transmitted within the downlink control channel (the PDCCH or ePDCCH), and such information as a position of a resource in the downlink transmission channel scheduled by the network device may be carried in the scheduling information. The scheduling information may be transmitted in DCI carrying a DL grant. The UE may determine the transmission subframe scheduled for first system information and second system information in accordance with the scheduling information. The first system information is system information of a first type, and the second system information is system information of a second type, i.e., the type of the second system information is different from the type of the first system information. To be specific, the first system information may be system information of a type known to the UE, i.e., an eSIB, and the second system information may be system information of a type unknown to the UE, i.e., the SIBs other than the eSIB, e.g., SIBx (x is a positive integer). It should be appreciated that, the second system information may be a set of the SIBs other than the eSIB, and the SIBs may be carried through one or more pieces of SI. One SI at least includes one SIB, and such information as a mapping relationship between the SI and the SIBs as well as a transmission position of the SI may be indicated in the eSIB.

Further, the network device may schedule different transmission subframes or the same transmission subframe for the eSIB and the SI, and the scheduling indication information may be carried in the DCI and transmitted to the UE.

Step 112: transmitting the first system information and/or the second system information to the UE within the transmission subframe indicated by the scheduling information.

In order to prevent the occurrence of a long access time relay or cell reselection for the UE due to a long transmission period of the system information, the network device may schedule the same transmission subframe for the eSIB and the SI, so as to increase the quantity of the system information to be transmitted within the transmission subframe. In addition, the information about the corresponding transmission subframe may be indicated in the DCI.

The method for transmitting the system information at the network device side has been described briefly hereinabove, and it will be described hereinafter in more details in conjunction with the drawings and a specific application scenario.

Step 111 may include scrambling the to-be-transmitted scheduling information in accordance with an RNTI, and transmitting the scrambled scheduling information to the UE.

The to-be-transmitted scheduling information may be scrambled in accordance with different RNTIs, so as to indicate whether the eSIB and the SI are transmitted within the same transmission subframe. When different transmission subframes are scheduled for the first system information and the second system information, the scheduling information may be scrambled in accordance with a first RNTI, and when the same transmission subframe is scheduled for the first system information and the second system information, the scheduling information may be scrambled in accordance with a second RNTI.

Apart from the above, whether the eSIB and the SI are transmitted within the same transmission subframe may be indicated in the following modes.

Mode 1: whether the same transmission subframe is scheduled for the first system information and the second system information may be indicated through a value of a specific field in the scheduling information. When the value of the specific field is a first value, it means different transmission subframes are scheduled for the first system information and the second system information, otherwise, it means the same transmission subframe is scheduled for the first system information and the second system information.

Further, serial number information about the second system information may be indicated through the value of the specific field.

Mode 2: the transmission subframe scheduled by the network device for the first system information and the second system information may be indicated through an information format of the scheduling information. When the information format of the scheduling information is a first information format, it means that different transmission subframes are scheduled for the first system information and the second system information, and when the information format of the scheduling information is a second information format, it means that the same transmission subframe is scheduled for the first system information and the second system information.

Mode 3: whether a specific transmission subframe is the transmission subframe scheduled for the first system information and/or the second system information may be indicated through a plurality of pieces of scheduling information corresponding to the specific transmission subframe.

To be specific, whether the specific transmission subframe is the transmission subframe scheduled for the first system information and/or the second system information may be indicated through values of specific bits in the plurality of pieces of scheduling information corresponding to the specific transmission subframe. When at least one of values of the specific bits in the plurality of pieces of scheduling information corresponding to the specific transmission subframe is a second value, it means that the specific transmission subframe is the transmission subframe scheduled by the network device for the first system information, and when at least one of values of the specific bits in the plurality of pieces of scheduling information corresponding to the specific transmission subframe is a third value, it means that the specific transmission subframe is the transmission subframe scheduled by the network device for the second system information.

In a possible embodiment of the present disclosure, whether the specific transmission subframe is the transmission subframe scheduled for the first system information and/or the second system information may be indicated through information formats of the plurality of pieces of scheduling information corresponding to the specific transmission subframe. When at least one of the information formats of the plurality of pieces of scheduling information corresponding to the specific transmission subframe is a third information format, it means that the specific transmission subframe is the transmission subframe scheduled by the network device for the first system information, and when at least one of the information formats of the plurality of pieces of scheduling information corresponding to the specific transmission subframe is a fourth information format, it means that the specific transmission subframe is the transmission subframe scheduled by the network device for the second system information.

Through different indication modes, it is able for the UE to acquire the transmission subframes for the eSIB and the SI through parsing the scheduling information, thereby to receive the corresponding eSIB and/or SI within the corresponding transmission subframe.

When transmitting the corresponding eSIB and/or SI within the scheduled transmission subframe, the network device may determine a size of a TB for transmitting the first system information and the second system information in accordance with an amount of the bits for the first system information and the second system information, and transmit the first system information and the second system information to the UE through the corresponding TB. Information about the size of the TB (i.e., a row and a column where the TB is located) may be carried in the scheduling information and transmitted to the UE.

A specific TBS may be selected in accordance with whether the eSIB and the SI are transmitted within the same transmission subframe. When the eSIB and the SI are transmitted within different transmission subframes or through different TBs, the TBs of a relatively small amount of bits may be required, and a column corresponding to a relatively small amount of bits in a TBS table may be selected. When the eSIB and the SI are transmitted within the same transmission subframe and through the same TB, the TB of a relatively large amount of bits may be required, and a column corresponding to a relatively large amount of bits in the TBS table may be selected. For example, when the SI is indicated by DCI format 1A, TBSs in a second column and a third column in the TBS table may be indicated through 1 bit (column) in 2 bits of a Transmission Power Control (TPC) command in conjunction with an MCS (row).

When the eSIB and the SI are transmitted simultaneously within one TB or the SI to be transmitted is of a relatively large amount of bits, a large TBS may be required, so a larger column may be selected. For example, the second and third columns may each be offset by a certain value, so that they correspond to a $(2+N)^{th}$ column and a $(3+N)^{th}$ column respectively (where N is a positive integer), or they correspond to a $(2+M)^{th}$ column and a $(3+L)^{th}$ column respectively (where M and L are different positive integers). In addition, a TBS for currently transmitting the SI or transmitting both the eSIB and the SI simultaneously may be indicated in accordance with the number of SIBs included in the SI and configured in an eSIB and indication information in the DCI (e.g., a reserved bit in the TPC command).

The method for transmitting the system information at the network device side has been described hereinabove. A corresponding device for transmitting the system information will be described hereinafter in accordance with the embodiments in conjunction with the drawings.

Figure 12:
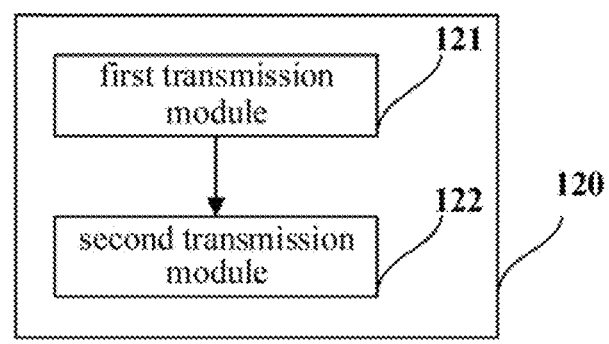
FIG. 12 is a block diagram of a device for transmitting the system information according to one embodiment of the present disclosure.

The present disclosure further provides in some embodiments a device 120 for transmitting system information for use in a network device which, as shown in FIG. 12, at least includes: a first transmission module 121 configured to transmit scheduling information to a UE, so as to enable the UE to determine a transmission subframe scheduled by the network device for first system information and second system information according to the scheduling information, the first system information being system information of a first type, the second system information being system information of a second type; and a second transmission module 122 configured to transmit the first system information and/or the second system information to the UE within the transmission subframe indicated in the scheduling information.

In a possible embodiment of the present disclosure, the first transmission module 121 includes: a scrambling unit configured to scramble the scheduling information in accordance with an RNTI; and a first transmission unit configured to transmit the scrambled scheduling information to the UE.

In a possible embodiment of the present disclosure, the scrambling unit is further configured to: scramble the scheduling information in accordance with different RNTIs; when different transmission subframes are scheduled for the first system information and the second system information, scramble the scheduling information in accordance with a first RNTI; and when the same transmission subframe is scheduled for the first system information and the second system information, scramble the scheduling information in accordance with a second RNTI.

In a possible embodiment of the present disclosure, the scheduling information includes the following indication states. Whether the same transmission subframe is scheduled for the first system information and the second system information may be indicated in accordance with a value of a specific field in the scheduling information. To be specific, when the value of the specific field is a first value, it indicates that different transmission subframes are scheduled for the first system information and the second system information, and otherwise, it indicates that the same transmission subframe is scheduled for the first system information and the second system information.

In a possible embodiment of the present disclosure, the scheduling information further includes the following indication states. Serial number information about the second system information may be indicated through the value of the specific field.

In a possible embodiment of the present disclosure, the scheduling information further includes the following indication states. The transmission subframe scheduled by the network device for the first system information and the second system information may be indicated through an information format of the scheduling information. To be specific, when the information format of the scheduling information is a first information format, it indicates that different transmission subframes are scheduled by the network device for the first system information and the second system information, and when the information format of the scheduling information is a second information format, it indicates that the same transmission subframe is scheduled by the network device for the first system information and the second system information.

In a possible embodiment of the present disclosure, the scheduling information includes the following indication states. Whether a specific transmission subframe is the transmission subframe scheduled for the first system information and/or the second system information may be indicated through a plurality of pieces of scheduling information corresponding to the specific transmission subframe.

To be specific, whether the specific transmission subframe is the transmission subframe scheduled for the first system information and/or the second system information being indicated through a plurality of pieces of scheduling information corresponding to the specific transmission subframe includes: whether the specific transmission subframe is the transmission subframe scheduled for the first system information and/or the second system information being indicated through values of specific bits in the plurality of pieces of scheduling information corresponding to the specific transmission subframe. When at least one of the values of the specific bits in the plurality of pieces of scheduling information corresponding to the specific transmission subframe is a second value, it indicates that the specific transmission subframe may be transmission subframe scheduled by the network device for the first system information, and when at least one of the values of the specific bits in the plurality of pieces of scheduling information corresponding to the specific transmission subframe is a third value, it indicates that the specific transmission subframe may be transmission subframe scheduled by the network device for the second system information.

In a possible embodiment of the present disclosure, whether the specific transmission subframe is the transmission subframe scheduled for the first system information and/or the second system information being indicated through a plurality of pieces of scheduling information corresponding to the specific transmission subframe includes: whether the specific transmission subframe is the transmission subframe scheduled for the first system information and/or the second system information being indicated through information formats of the plurality of pieces of scheduling information corresponding to the specific transmission subframe. When at least one of the information formats of the plurality of pieces of scheduling information corresponding to the specific transmission subframe is a third information format, it indicates that the specific transmission subframe may be transmission subframe scheduled by the network device for the first system information, and when at least one of the information formats of the plurality of pieces of scheduling information corresponding to the specific transmission subframe is a fourth information format, it indicates that the specific transmission subframe may be transmission subframe scheduled by the network device for the second system information.

In a possible embodiment of the present disclosure, the second transmission module includes: a selection unit configured to determine a size of a TB for transmitting the first system information and the second system information in accordance with an amount of bits for the first system information and the second system information; and a transmission unit configured to transmit the first system information and the second system information to the UE through the corresponding TB.

The implementation of the device may refer to that of the method mentioned hereinabove, with a same technical effect.

Figure 13:
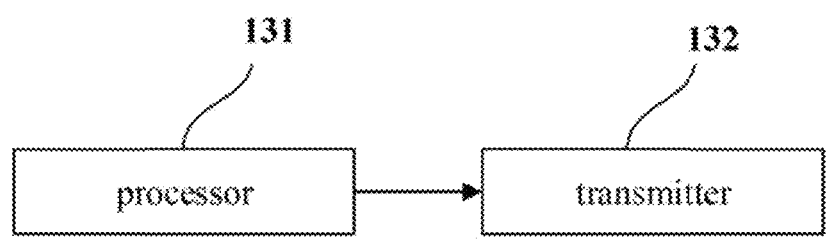
FIG. 13 is a block diagram of a network device according to one embodiment of the present disclosure.

The present disclosure further provides in some embodiments a network device which, as shown in FIG. 13, includes a processor 131, a transmitter 132, and a memory configured to store therein instructions or data capable of being executed by the processor 131. The processor 131 is configured to generate scheduling information. The scheduling information is used to indicate a transmission subframe scheduled by the network device for the system information, the system information includes first system information and/or second system information, the first system information is system information of a first type, the second system information is system information of a second type. The transmitter 132 is connected to the processor 131 and configured to transmit the scheduling information to a UE, and transmit the first system information and/or the second system information to the UE within the transmission subframe indicated in the scheduling information.

It should be appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order as described in the description. Alternatively, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order as described in the description. Alternatively, some steps may also be performed in parallel, or independently of each other.

A1. A method for transmitting system information for use in a UE comprising:
acquiring scheduling information transmitted from a network device;

determining a transmission subframe scheduled by the network device for the system information in accordance with the scheduling information, wherein the system information comprises first system information and/or second system information, the first system information is system information of a first type, and the second system information is system information of a second type; and receiving the system information transmitted from the network device within the transmission subframe.

A2. The method according to A1, wherein the determining the transmission subframe scheduled by the network device for the system information in accordance with the scheduling information comprises:

performing descrambling analysis on the scheduling information in accordance with a Radio Network Temporary Identity (RNTI), to determine the transmission subframe scheduled by the network device for the system information.

A3. The method according to A2, wherein the performing descrambling analysis on the scheduling information in accordance with the RNTI, to determine the transmission subframe scheduled by the network device for the system information comprises: when the scheduling information has been descrambled successfully in accordance with the RNTI having a first value, determining that the first system information is to be transmitted within the transmission subframe, and the receiving the system information transmitted from the network device within the transmission subframe comprises: receiving the first system information transmitted from the network device within the transmission subframe.

A4. The method according to A2, wherein the performing descrambling analysis on the scheduling information in accordance with the RNTI, to determine the transmission subframe scheduled by the network device for the system information comprises: when the scheduling information has been descrambled successfully in accordance with the RNTI having a second value, determining that the first system information and the second system information are transmitted within the same transmission subframe; and the receiving the system information transmitted from the network device within the transmission subframe comprises: receiving the first system information and the second system information within the same transmission subframe.

A5. The method according to A1, wherein the determining the transmission subframe scheduled by the network device for the system information in accordance with the scheduling information comprises:

determining the transmission subframe scheduled by the network device for the system information in accordance with a specific field in the scheduling information; or determining the transmission subframe scheduled by the network device for the system information in accordance with an information format of the scheduling information.

A6. The method according to A5, wherein the determining the transmission subframe scheduled by the network device for the system information in accordance with the specific field in the scheduling information comprises:

acquiring a value of the specific field in the scheduling information;

when the value of the specific field is a first value, determining that different transmission subframes are scheduled by the network device for the first system information and the second system information; and when the value of the specific field is not the first value, determining that the same transmission subframe is scheduled by the network device for the first system information and the second system information.

A7. The method according to A5, wherein the determining the transmission subframe scheduled by the network device for the system information in accordance with the information format of the scheduling information comprises:

when the information format of the scheduling information is a first information format, determining that different transmission subframes are scheduled by the network device for the first system information and the second system information; and when the information format of the scheduling information is a second information format, determining that the same transmission subframe is scheduled by the network device for the first system information and the second system information.

A8. The method according to A1, wherein the determining the transmission subframe scheduled by the network device for the system information in accordance with the scheduling information comprises:

acquiring a plurality of pieces of scheduling information corresponding to a specific transmission subframe; and determining the transmission subframe scheduled by the network device for the system information in accordance with the plurality of pieces of scheduling information corresponding to the specific transmission subframe.

A9. The method according to A8, wherein the determining the specific transmission subframe to be the transmission subframe scheduled by the network device for the system information in accordance with the plurality of pieces of scheduling information corresponding to the specific transmission subframe comprises:

when at least one of values of bits in the plurality of pieces of scheduling information corresponding to the specific transmission subframe is a second value, determining the specific transmission subframe to be the transmission subframe scheduled by the network device for the first system information; and when at least one of the values of the bits in the plurality of pieces of scheduling information corresponding to the specific transmission subframe is a third value, determining the specific transmission subframe to be the transmission subframe scheduled by the network device for the second system information.

A10. The method according to A8, wherein the determining the transmission subframe scheduled by the network device for the system information in accordance with the plurality of pieces of scheduling information corresponding to the specific transmission subframe comprises:

when at least one of information formats of the plurality of the pieces of scheduling information corresponding to the specific transmission subframe is a third information format, determining the specific transmission subframe to be the transmission subframe scheduled by the network device for the first system information; and when at least one of the values of the bits in the plurality of the pieces of scheduling information corresponding to the specific transmission subframe is a fourth information format, determining the specific transmission subframe to be the transmission subframe scheduled by the network device for the second system information.

A11. The method according to any one of A1 to A10, wherein prior to receiving the system information transmitted from the network device within the transmission subframe, the method further comprises:

determining serial number information about the second system information in accordance with a MIB or the value of the specific field in the scheduling information; and determining a type of a SIB corresponding to the serial number information about the second system information.

A12. The method according to any one of A1 to A11, wherein prior to prior to receiving the system information transmitted from the network device within the transmission subframe, the method further includes:

determining a size of a TB occupied by the first system information and/or a size of a TB occupied by the second system information in accordance with the scheduling information.

B13. A method for transmitting system information for use in a network device, comprising:

transmitting scheduling information to a UE, wherein the scheduling information is used to indicate a transmission subframe scheduled by the network device for the system information, the system information comprises first system information and/or second system information, the first system information is system information of a first type, and the second system information is system information of a second type; and transmitting the system information to the UE within the transmission subframe.

B14. The method according to B13, wherein prior to transmitting the scheduling information to the UE, the method further comprising:

scrambling the scheduling information in accordance with an RNTI.

B15. The method according to B14, wherein the scrambling the scheduling information in accordance with the RNTI comprises:

when different transmission subframes are scheduled for the first system information and the second system information, scrambling the scheduling information in accordance with a first RNTI; and when the same transmission subframe is scheduled for the first system information and the second system information, scrambling the scheduling information in accordance with a second RNTI.

B16. The method according to B13, wherein the transmission subframe scheduled by the network device for the system information is indicated through a specific field or an information format of the scheduling information.

B17. The method according to B16, wherein the scheduling information includes following indication states:

when a value of the specific field is a first value, it indicates that different transmission subframes are scheduled for the first system information and the second system information; and when the value of the specific field is not the first value, it indicates that the same transmission subframe is scheduled for the first system information and the second system information.

B18. The method according to B17, wherein the scheduling information further includes a following indication state:

serial number information about the second system information is indicated through the value of the specific field.

B19. The method according to B16, wherein the scheduling information includes following indication states:

when the information format of the scheduling information is a first information format, it indicates that different transmission subframes are scheduled for the first system information and the second system information; and when the information format of the scheduling information is a second information format, it indicates that the same transmission subframe is scheduled for the first system information and the second system information.

B20. The method according to B13, wherein the scheduling information includes a following indication state:

the specific transmission subframe is indicated to be the transmission subframe scheduled for the first system information and/or the second system information through a plurality of pieces of scheduling information corresponding to the specific transmission subframe.

B21. The method according to B20, wherein the specific transmission subframe being indicated to be the transmission subframe scheduled for the first system information and/or the second system information through a plurality of pieces of scheduling information corresponding to the specific transmission subframe comprises:

when at least one of values of specific bits in the plurality of pieces of scheduling information corresponding to the specific transmission subframe is a second value, indicating that the specific transmission subframe is the transmission subframe scheduled by the network device for the first system information; and when at least one of the values of the specific bits in the plurality of pieces of scheduling information corresponding to the specific transmission subframe is a third value, indicating that the specific transmission subframe is the transmission subframe scheduled by the network device for the second system information.

B22. The method according to B20, wherein the specific transmission subframe being indicated to be the transmission subframe scheduled for the first system information and/or the second system information through a plurality of pieces of scheduling information corresponding to the specific transmission subframe comprises:

when at least one of information formats of the plurality of the pieces of scheduling information corresponding to the specific transmission subframe is a third information format, indicating that the specific transmission subframe is the transmission subframe scheduled by the network device for the first system information; and when at least one of the information formats of the plurality of the pieces of scheduling information corresponding to the specific transmission subframe is a fourth information format, indicating that the specific transmission subframe is the transmission subframe scheduled by the network device for the second system information.

B23. The method according to any one of B13 to B22, wherein transmitting the system information to the UE within the transmission subframe:

determining a size of a TB for transmitting the first system information and a size of a TB for transmitting the second system information in accordance with an amount of bits for the first system information and an amount of bits for the second system information respectively; and transmitting the first system information and the second system information to the UE through the corresponding TB.

C24. A device for transmitting system information for use in a UE, comprising:

an acquisition module configured to acquire scheduling information transmitted from a network device;

a processing module configured to determine a transmission subframe scheduled by the network device for the system information in accordance with the scheduling information, wherein the system information comprises first system information and/or second system information, the first system information is system information of a first type, and the second system information is system information of a second type; and a reception module configured to receive the system information transmitted from the network device within the transmission subframe.

D25. A device of transmitting system information for use in a network device, comprising:

a first transmission module configured to transmit scheduling information to a UE, wherein the scheduling information is used to indicate a transmission subframe scheduled by the network device for the system information, the system information comprises first system information and/or second system information, the first system information is system information of a first type, and the second system information is system information of a second type; and a second transmission module configured to transmit the system information to the UE within the transmission subframe.

E26. A UE comprising:

a receiver configured to receive scheduling information transmitted from a network device;

a processor connected to the receiver and configured to determine a transmission subframe scheduled by the network device for the system information in accordance with the scheduling information, wherein the system information comprises first system information and/or second system information, the first system information is system information of a first type, and the second system information is system information of a second type, wherein the receiver is further configured to receive the first system information and/or the second system information transmitted by the network device through the transmission subframe.

F27. A network device, including:

a processor configured to generate scheduling information, wherein the scheduling information is used to indicate a transmission subframe scheduled by the network device for the system information, the system information comprises first system information and/or second system information, the first system information is system information of a first type, and the second system information is system information of a second type; and a transmitter connected to the processor and configured to transmit the scheduling information to a UE, and transmit the system information to the UE within the transmission subframe.

The above are preferred embodiments of the present disclosure. It should be appreciated that a person skilled in the art may make further modifications and improvements without departing from the spirit of the present disclosure, and these modifications and improvements shall also fall within the scope of the present disclosure.

What is claimed is:

1. A method for transmitting system information for use in a User Equipment (UE), comprising:

acquiring scheduling information transmitted from a network device;

determining a transmission subframe scheduled by the network device for the system information in accordance with the scheduling information, wherein the system information comprises first system information and/or second system information, the first system information is system information of a first type, and the second system information is system information of a second type; and receiving the system information transmitted from the network device within the transmission subframe, wherein the determining the transmission subframe scheduled by the network device for the system information in accordance with the scheduling information comprises:

determining the transmission subframe scheduled by the network device for the system information in accordance with a specific field in the scheduling information; or determining the transmission subframe scheduled by the network device for the system information in accordance with an information format of the scheduling information, wherein the determining the transmission subframe scheduled by the network device for the system information in accordance with the specific field in the scheduling information comprises: acquiring a value of the specific field in the scheduling information; when the value of the specific field is a first value, determining that different transmission subframes are scheduled by the network device for the first system information and the second system information; and when the value of the specific field is not the first value, determining that the same transmission subframe is scheduled by the network device for the first system information and the second system information;

the determining the transmission subframe scheduled by the network device for the system information in accordance with the information format of the scheduling information comprises: when the information format of the scheduling information is a first information format, determining that different transmission subframes are scheduled by the network device for the first system information and the second system information and when the information format of the scheduling information is a second information format, determining that the same transmission subframe is scheduled by the network device for the first system information and the second system information.

2. The method according to claim 1, wherein the determining the transmission subframe scheduled by the network device for the system information in accordance with the scheduling information comprises:

performing descrambling analysis on the scheduling information in accordance with a Radio Network Temporary Identity (RNTI), to determine the transmission subframe scheduled by the network device for the system information.

3. The method according to claim 2, wherein the performing descrambling analysis on the scheduling information in accordance with the RNTI, to determine the transmission subframe scheduled by the network device for the system information comprises:

when the scheduling information has been descrambled successfully in accordance with the RNTI having a first value, determining that the first system information is to be transmitted within the transmission subframe, and the receiving the system information transmitted from the network device within the transmission subframe comprises: receiving the first system information transmitted from the network device within the transmission subframe.

4. The method according to claim 2, wherein the performing descrambling analysis on the scheduling information in accordance with the RNTI, to determine the transmission subframe scheduled by the network device for the system information comprises: when the scheduling information has been descrambled successfully in accordance with the RNTI having a second value, determining that the first system information and the second system information are transmitted within the same transmission subframe; and the receiving the system information transmitted from the network device within the transmission subframe comprises: receiving the first system information and the second system information within the same transmission subframe.

5. The method according to claim 1, wherein the determining the transmission subframe scheduled by the network device for the system information in accordance with the scheduling information comprises:

acquiring a plurality of pieces of scheduling information corresponding to a specific transmission subframe; and determining the specific transmission subframe to be the transmission subframe scheduled by the network device for the system information in accordance with the plurality of pieces of scheduling information corresponding to the specific transmission subframe.

6. The method according to claim 5, wherein the determining the specific transmission subframe to be the transmission subframe scheduled by the network device for the system information in accordance with the plurality of pieces of scheduling information corresponding to the specific transmission subframe comprises:

when at least one of values of bits in the plurality of pieces of scheduling information corresponding to the specific transmission subframe is a second value, determining the specific transmission subframe to be the transmission subframe scheduled by the network device for the first system information; and when at least one of the values of the bits in the plurality of pieces of scheduling information corresponding to the specific transmission subframe is a third value, determining the specific transmission subframe to be the transmission subframe scheduled by the network device for the second system information.

7. The method according to claim 5, wherein the determining the specific transmission subframe to be the transmission subframe scheduled by the network device for the system information in accordance with the plurality of pieces of scheduling information corresponding to the specific transmission subframe comprises:

when at least one of information formats of the plurality of the pieces of scheduling information corresponding to the specific transmission subframe is a third information format, determining the specific transmission subframe to be the transmission subframe scheduled by the network device for the first system information; and when at least one of values of bits in the plurality of the pieces of scheduling information corresponding to the specific transmission subframe is a fourth information format, determining the specific transmission subframe to be the transmission subframe scheduled by the network device for the second system information.

8. The method according to claim 1, wherein prior to receiving the system information transmitted from the network device within the transmission subframe, the method further comprises:

determining serial number information about the second system information in accordance with a Master Information Block (MIB) or a value of a specific field in the scheduling information; and determining a type of a System Information Block (SIB) corresponding to the serial number information about the second system information.

9. The method according to claim 1, wherein prior to receiving the system information transmitted from the network device within the transmission subframe, the method further includes:

determining a size of a Transport Block (TB) occupied by the first system information and/or a size of a TB occupied by the second system information in accordance with the scheduling information.

10. A method for transmitting system information for use in a network device, comprising:

transmitting scheduling information to a UE, wherein the scheduling information is used to indicate a transmission subframe scheduled by the network device for the system information, the system information comprises first system information and/or second system information, the first system information is system information of a first type, and the second system information is system information of a second type; and transmitting the system information to the UE within the transmission subframe, wherein prior to transmitting the scheduling information to the UE, the method further comprising:

scrambling the scheduling information in accordance with an RNTI, wherein the scrambling the scheduling information in accordance with the RNTI comprises:

when different transmission subframes are scheduled for the first system information and the second system information, scrambling the scheduling information in accordance with a first RNTI; and when the same transmission subframe is scheduled for the first system information and the second system information, scrambling the scheduling information in accordance with a second RNTI.

11. The method according to claim 10, wherein the transmission subframe scheduled by the network device for the system information is indicated through a specific field or an information format of the scheduling information.

12. The method according to claim 11, wherein when a value of the specific field is a first value, it indicates that different transmission subframes are scheduled for the first system information and the second system information; and when the value of the specific field is not the first value, it indicates that the same transmission subframe is scheduled for the first system information and the second system information.

13. The method according to claim 11, wherein when the information format of the scheduling information is a first information format, it indicates that different transmission subframes are scheduled for the first system information and the second system information; and when the information format of the scheduling information is a second information format, it indicates that the same transmission subframe is scheduled for the first system information and the second system information.

14. The method according to claim 10, wherein a specific transmission subframe is indicated to be the transmission subframe scheduled for the first system information and/or the second system information through a plurality of pieces of scheduling information corresponding to the specific transmission subframe, the transmitting the system information to the UE within the transmission subframe comprises:
  determining a size of a TB for transmitting the first system information and a size of a TB for transmitting the second system information in accordance with an amount of bits for the first system information and an amount of bits for the second system information respectively; and
  transmitting the first system information and the second system information to the UE through the corresponding TBs.

15. The method according to claim 10, wherein the transmitting the system information to the UE within the transmission subframe comprises:
  determining a size of a TB for transmitting the first system information and a size of a TB for transmitting the second system information in accordance with an amount of bits for the first system information and an amount of bits for the second system information respectively; and
  transmitting the first system information and the second system information to the UE through the corresponding TBs.

16. A UE, comprising a processor, a receiver, and a memory configured to store therein instructions or data,
  wherein the receiver is configured to receive scheduling information transmitted from a network device;
  the processor is connected to the receiver and configured to execute the instructions or data stored in the memory, to implement a step of: determining a transmission subframe scheduled by the network device for system information in accordance with the scheduling information, wherein the system information comprises first system information and/or second system information, the first system information is system information of a first type, and the second system information is system information of a second type; and
  the receiver is further configured to receive the system information transmitted from the network device within the transmission subframe,
  wherein determining the transmission subframe scheduled by the network device for the system information in accordance with the scheduling information comprises:
  determining the transmission subframe scheduled by the network device for the system information in accordance with a specific field in the scheduling information; or
  determining the transmission subframe scheduled by the network device for the system information in accordance with an information format of the scheduling information,
  wherein the determining the transmission subframe scheduled by the network device for the system information in accordance with the specific field in the scheduling information comprises: acquiring a value of the specific field in the scheduling information; when the value of the specific field is a first value, determining that different transmission subframes are scheduled by the network device for the first system information and the second system information; and when the value of the specific field is not the first value, determining that the same transmission subframe is scheduled by the network device for the first system information and the second system information;
  the determining the transmission subframe scheduled by the network device for the system information in accordance with the information format of the scheduling information comprises: when the information format of the scheduling information is a first information format, determining that different transmission subframes are scheduled by the network device for the first system information and the second system information; and when the information format of the scheduling information is a second information format, determining that the same transmission subframe is scheduled by the network device for the first system information and the second system information.

* * * * *